Sept. 23, 1941.  E. H. HALL  2,257,006
CLUTCH ENGAGING MECHANISM
Filed June 30, 1939  2 Sheets-Sheet 2
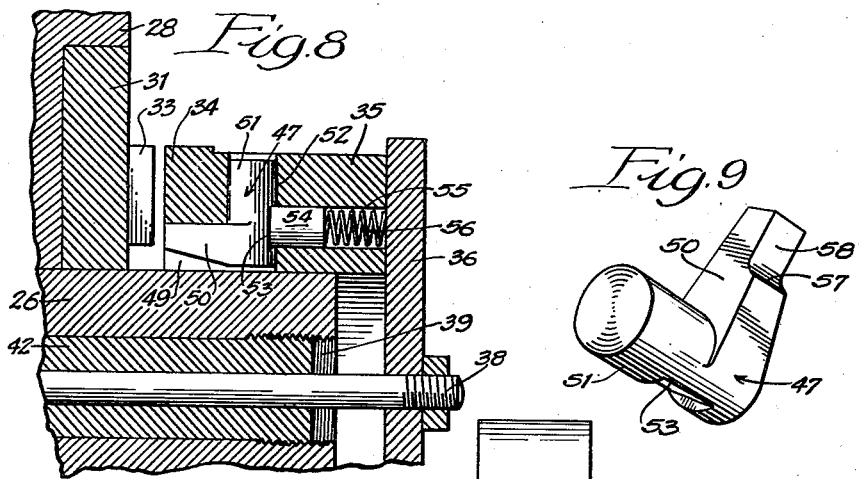
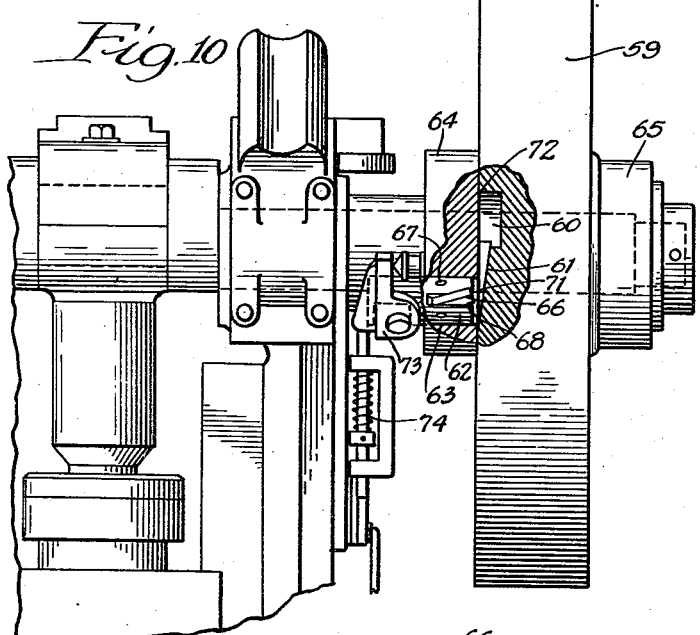
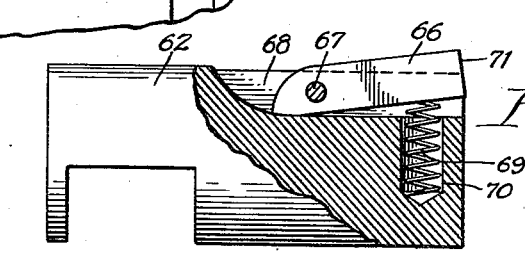
Inventor:
Edward H. Hall,
By Cummings & Cummings
Attorneys.

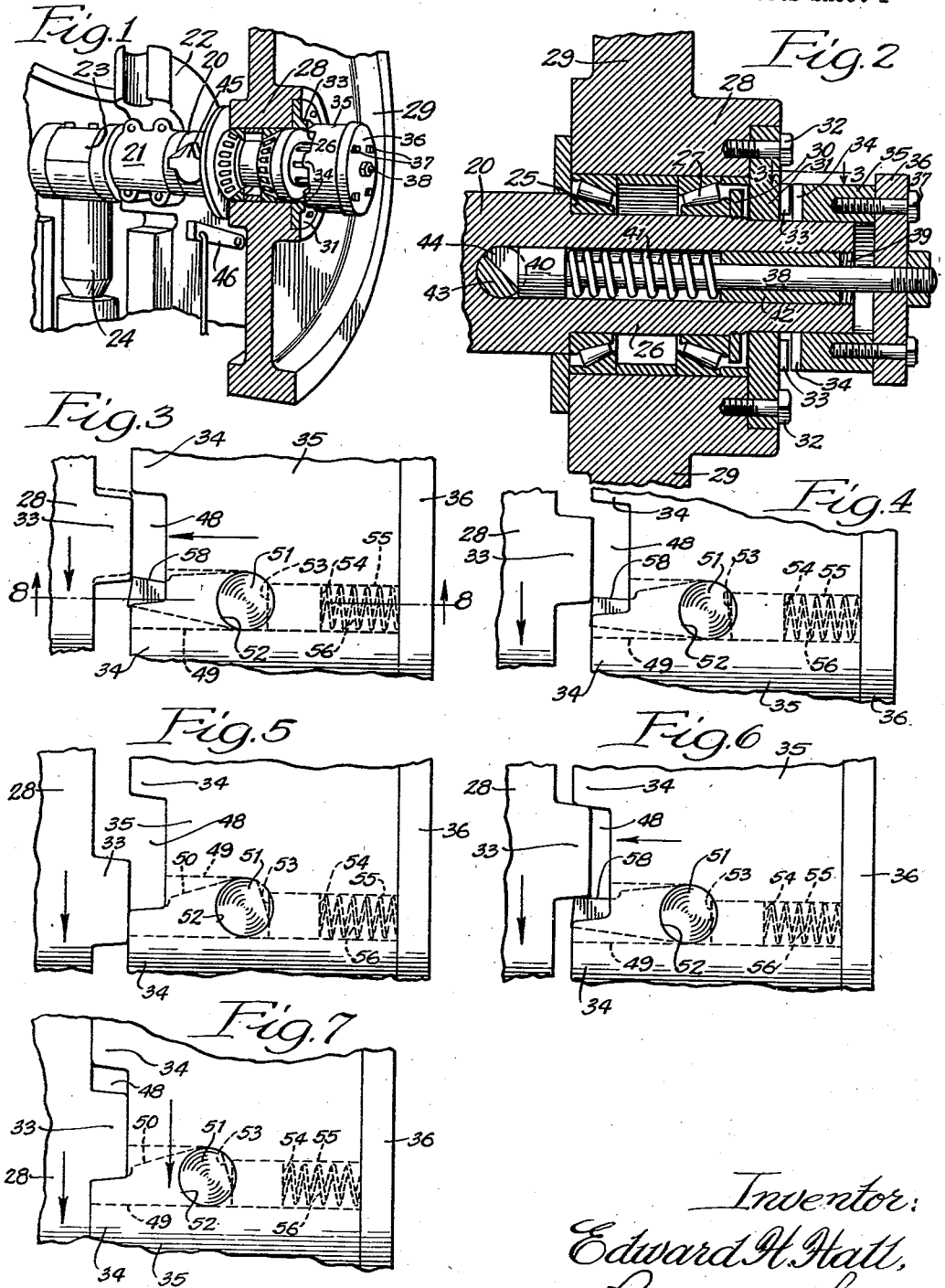

Patented Sept. 23, 1941

2,257,006

UNITED STATES PATENT OFFICE 2,257,006

CLUTCH ENGAGING MECHANISM

Edward H. Hall, Chicago, Ill.

Application June 30, 1939, Serial No. 282,161

3 Claims. (Cl. 192—67)

The clutch of the present invention is designed primarily though not exclusively for use in the transmission of power from the constantly rotating fly wheel of a punch press or the like to the crank shaft with which the die head is connected.

In mechanism of this character it is customary to provide a driven clutch element having teeth or the like which when thrown will engage with the companion teeth of the constantly rotating clutch element, and in such circumstances it frequently happens that the clutch engagement will be effected at an instant when the tips only of the clutch teeth make contact with one another and before an effective intermeshing is secured, with the result that a heavy load is suddenly thrown upon the tips of the teeth with resultant wear or breakage.

The present invention is directed to the provision of means for insuring a complete engagement of the clutch elements before the resistance of the load is encountered, so that adequate clutching contact will be afforded to withstand the sudden stress to which the parts are subjected. This is effected by the use of a yieldable dog or the like which blocks the interengagement of the clutching elements unless they are thrown while in proper registering relation to one another and defers the engagement of the clutch elements until such proper register is insured.

Although the invention has been designed for use with punch presses or the like, the principles involved are adapted for general application under circumstances where heavy stresses are encountered in the clutching of driving and driven elements.

Further objects and details will appear from the description of the invention in conjunction with the accompanying drawings, wherein, Figure 1 is a fragmentary perspective view partly in section of the fly wheel of a punch press and other portions of the mechanism associated therewith;

Fig. 2 is a sectional elevation through the clutch of the present invention;

Figs. 3, 4, 5, 6, and 7 are diagrammatic views showing various relationships between the driving and driven clutch elements, and illustrating progressively the manner in which a proper clutching of the parts is insured;

Fig. 8 is a sectional elevation on line 8—8 of Fig. 3;

Fig. 9 is a perspective view of the dog for regulating the clutch engagement;

Fig. 10 is a side elevation of the head of a punch press partly broken away and showing a modified form of construction; and Fig. 11 is a sectional detail showing the type of dog employed in the construction of Fig. 10.

The clutch elements of the present invention are shown as applied to the crank shaft 20 of a punch press, which is journalled within bearings 21 carried by the upper frame 22 of the punch press, and the shaft is provided with the usual crank 23 driving a plunger 24, or any other suitable or conventional tool or device.

The shaft 20 is shouldered at the point 25 to provide a reduced outer section 26 which carries roller bearings 27 which serve to mount the hub 28 of a fly wheel 29. The roller bearings, as shown, are of the type known as the Timken roller bearings, and they are held in position by a ring 30 which is threaded onto the outer end of the shaft which is slightly reduced beyond the threading to permit the ring 30 to be slipped inwardly upon the shaft to engage the threads thereon. The hub 28 carries an inwardly projecting ring disk 31 which is socketed within the outer face of the hub and securely held thereon by bolts 32. The inner margin of the ring closely encircles the outer reduced end of the shaft 20.

The ring disk is provided on its outer face with a series of clutch teeth 33 which constitute the driving clutch elements in the exemplification of the invention shown in Fig. 1, which teeth coact with a series of driven clutch teeth 34 on the inner face of a clutch mounting in the form of a ring collar 35 which is slidably keyed upon the outer reduced end of the shaft so as to be adjusted thereon but rotatable therewith.

The outer end of the ring collar 35 is closed by a cap plate 36 secured to the ring collar by bolts 37. The cap is actuated by a plunger rod 38 which extends axially through a bore 39 in the shaft 20, and terminates at its forward end in an enlarged head 40 which closely fits within the bore. The plunger rod is encircled by a coil spring 41 and is entered through a bushing 42 threaded into the outer end of the bore 39, the arrangement being such as to permit the plunger rod to be moved rearwardly under increasing spring pressure, thus retracting the ring collar and the driven clutch elements connected therewith.

In order to impart axial movements to the plunger rod 38, a rotatable cam 43 is provided which, as shown, constitutes the half cylindrical section of a rotatable transverse rock shaft 44 which extends transversely through an aperture in the shaft 20 and is provided on its projecting end with a trip finger 45 adapted to be engaged by a trip arm 46 where it is desired to automatically trip the clutch at a desired instant. If automatic tripping is not desired the trip finger may be manually operated.

The cam 43 is so positioned that when turned to present its arcuate face in contact with the head of the plunger it will impart an outward thrust, but when turned to present its full face thereto it will permit the plunger to move inwardly under the thrust of the spring 41. Thus when the cam stands in the position shown in Fig. 2, the clutch teeth 33 and 34 will be out of engagement, but when the cam is moved to a position to permit the plunger to engage the flat side of the cam the clutch teeth 34 will be permitted to move into engaging position unless blocked by the dog 47, which constitutes the special feature of the present invention.

As shown in Figs. 3 to 7 inclusive, the gaps 48 in the faces of the clutch collar 35, which intervene between the teeth 34, are of greater length circumferentially than the length of the driving clutch teeth 33, and the driven tooth in each instance is provided on its driven or engaging face with an inwardly extending slot or bore 49 which affords a mounting for the tooth 50 of the associated dog 47. The tooth extends at right angles to a journal stud 51 which is journalled within a bore 52 extending radially through the body of the ring collar 35.

The journal stud 51 is provided with a notch 53 having a flat inner face which is contacted by a cylindrical block 54 slidably mounted within a longitudinally extending bore 55 and backed by a spring 56 which normally holds the inner end of the block 54 into flatwise contact with the base of the notch 53, but permits the dog to rock under spring tension.

The tooth 50 of the dog 47 is provided with a shoulder 57 near its outer end, and terminates in a tip portion 58 of reduced cross section, and the dog normally stands in the inwardly projected position shown in Fig. 3, so that the gap 48 between adjacent clutch teeth will be partially obstructed by the end of the dog. In these circumstances, if the clutch is thrown, which would normally effect engagement of the clutch teeth, and if the complementary clutch teeth occupy the position shown in Fig. 3, the dog will engage the forward outer corner of the driving tooth and prevent interengagement of the teeth at that instant, but will defer the clutch engagement until the driving tooth 33 has advanced to the next engaging position, so that the parts will slip together into complete clutching relation without an initially partial clutching engagement between the corners of the teeth which it is the purpose of the present invention to prevent.

Fig. 4 indicates the position of the dog slightly after the first contact with the tooth 33, and in this instance it will be noted that the dog has been partially rotated or has ridden along with the advancing tooth 33, and this riding of the parts together will continue as in Fig. 5 until the dog has been rocked to the limit of its movement and against the tension afforded by the spring 56. As shown in Fig. 5, the driving tooth 33 has ridden with the dog until it establishes substantial outer face contact with the next lower driven tooth 34, and such sliding face contact will be maintained and the clutch prevented from engaging until the parts assume the position shown in Fig. 6, in which sufficient clearance within the gap 48 is afforded above or in advance of the dog to permit the teeth of the driven clutch element to slip into full engagement with the driving clutch tooth 33. It will be noted, however, that in Fig. 6 the forward or driving face of the tooth 33 contacts the inner edge of the dog tooth so that the continued advance of the driving tooth will depress the dog to the position shown in Fig. 7, in which full contact is afforded between the forward or driving face of the tooth 33 and the rear or driven face of the tooth 34.

This completes the clutching operation by the interposition of a yielding element (the dog) which blocks off any partial engagement of the clutch teeth until an instant when the parts are in proper register to permit adequate interengagement between the advancing driving tooth and the dog which being yieldable will initially receive the thrust of the driving tooth and allow the parts to completely slip together during the yielding period and until complete facial contact has been established between the driving and driven elements. This insures against the sudden partial engagement between the moving and stationary clutch elements and brings the parts together progressively and in a manner to prevent wear and breakage due to incomplete engagement.

Another application of the same general principle is shown in Figs. 10 and 11. This shows the special features of the present invention as employed in connection with power press mechanism of the general character shown in Patent No. 1,947,892, of February 20, 1934. In this instance, the fly wheel 59 is provided on its inner face with one or more clutch socket recesses 60, each of which forms the terminus of an inclined approach 61 adapted to facilitate the entrance of a pin 62 socketed within a bore 63 in a flange collar 64 keyed to the cranked driving shaft 65. When the pin 62 is thrust outwardly it will, unless blocked, slide along the approach surface 61 until it enters the recess 60, thereby completing the clutching of the parts.

The special feature of the present invention in this form of construction finds embodiment in a dog 66 which is pivoted upon a pintle 67 within a slot 68 in the face of the clutch pin 62. The free end of the dog is backed by a spring 69 located within a bore 70 in the pin, so that the dog will normally project beyond the cylindrical surface of the pin and present its forward face 71 in position to block the entrance of the pin into the socket recess 60 unless sufficient clearance is afforded for the outer corner of the dog to clear the rear margin 72 of the recess. Thus if the pin is projected while insufficient clearance is afforded, the forward end 71 of the dog will engage the outer marginal face of the constantly rotating fly wheel and prevent the pin from entering the recess until the fly wheel has rotated sufficiently to bring the next recess of the series (if more than one be provided) into register with the pin, in which event the pin will advance inwardly along the sloping approach surface 61 until the recess is encountered and a full clutching relationship is established. The pin is actuated by a lever 73 under the control of a foot treadle mechanism 74 of the character more fully described in Patent No. 1,947,892, but any suitable or adequate mechanism may be employed for thrusting the pin inwardly to effect a clutching of the parts.

It will be understood that in this construction, as in the one first described, when the pin is thrust inwardly into the clutch recess, the continued movement of the fly wheel will cause the dog to yield within the slot 63 until the face of the pin comes into full clutching engagement with the driving face of the clutch recess. It will also be understood that the principles here involved may find embodiment in other forms of construction and that the two examples here given serve as exemplifications of the principle involved which resides in the employment of a yielding member in the nature of a dog associated with one of the clutch elements and which, when projected, affords an obstruction against the clutching of the parts until the same are brought into sufficiently close register to permit the obstructing element (dog or the like) to make a preliminary entrance into the complementary clutch element, so that continued relative rotation of the parts and the yielding of the dog will establish a complete clutching engagement.

The special feature of the present invention may be applied to existing clutch mechanisms of various types without substantial modification in structure, since the clutching operation in all other respects will be performed in a conventional manner and irrespective of the presence of the dog or other obstructing member constituting the subject of the present invention.

I claim:

1. In clutch mechanism of the character described, the combination of driving and driven clutch elements having coincidental axial alignment and adapted to be moved axially relatively with respect to one another, said clutch elements having on their opposed faces clutch members adapted to interengage with one another, one of said clutch members being provided with a slot having yieldably mounted therein a pivoted dog adapted normally to be projected forwardly into position to obstruct the entrance of the complementary clutch member save when the parts are in close register and having its outer end substantially flush with the outer face of said clutch member, and adapted when the parts are in close register and have been moved into clutching relationship to yield backwardly into said slot under driving pressure directed against said member until full clutching contact has been established, the clutch elements being so related as to impart such driving pressure.

2. In clutch mechanism of the character described, the combination of driving and driven clutch elements having coincidental axial alignment and adapted to be moved axially relatively with respect to one another, said clutch elements having on their opposed faces clutch members adapted to interengage with one another, one of said clutch members being provided with a slot having yieldably mounted therein a pivoted dog adapted normally to be projected forwardly into position to obstruct the entrance of the complementary clutch member save when the parts are in close register and having its outer end substantially flush with the outer face of said clutch member, and adapted when the parts are in close register and have been moved into clutching relationship to yield backwardly into said slot until full clutching contact has been established, a constantly rotating fly wheel to which one of said clutch elements is secured, a driven shaft upon which the other clutch element is non-rotatably and slidably mounted, and means for moving the last named clutch element axially with respect to the constantly rotating complementary clutch element.

3. In clutch mechanism of the character described, the combination of a driven shaft, a driving clutch element rotatably mounted on the driven shaft, a driven clutch element slidably and non-rotatably mounted upon the driven shaft, clutch members on the opposed faces of the driving and driven clutch elements, means for moving the driven clutch element axially to bring the clutch members into interengaging relationship, the clutch members being in the form of a tooth on one of the clutch elements and a complementary recess on the other clutch element terminating in a face provided with a slot, the recess being of greater length than the tooth, and a pivoted dog yieldably mounted within the slot at the end of said recess which is subjected to the driving thrust and adapted normally to project forwardly into said recess in position to prevent the complementary clutch tooth from entering said recess save when the parts are in close register and having its outer end substantially flush with the outer face of said clutch member and adapted when such entry has been effected to yield until the tooth is brought into engagement with the aforementioned end of said recess.

EDWARD H. HALL.